(12) United States Patent
Qiu

(10) Patent No.: US 12,392,377 B2
(45) Date of Patent: Aug. 19, 2025

(54) ANTI-STATIC BEARING ASSEMBLY AND ELLIPTICAL MACHINE

(71) Applicant: Xiamen Weldconn Technology Co., Ltd., Fujian (CN)

(72) Inventor: Jianbiao Qiu, Fujian (CN)

(73) Assignee: Xiamen Weldconn Technology Co., Ltd., Xiamen (CN)

( * ) Notice: Subject to any disclaimer, the term of this patent is extended or adjusted under 35 U.S.C. 154(b) by 61 days.

(21) Appl. No.: 18/428,162

(22) Filed: Jan. 31, 2024

(65) Prior Publication Data
US 2025/0129820 A1 Apr. 24, 2025

(30) Foreign Application Priority Data
Oct. 24, 2023 (CN) .......................... 202311380924.4

(51) Int. Cl.
*F16C 41/00* (2006.01)
*A63B 22/00* (2006.01)
*A63B 22/06* (2006.01)

(52) U.S. Cl.
CPC .......... *F16C 41/002* (2013.01); *A63B 22/001* (2013.01); *A63B 22/0664* (2013.01); *A63B 2022/0682* (2013.01); *F16C 2316/00* (2013.01)

(58) Field of Classification Search
CPC .... F16C 41/002; F16C 2316/00; F16C 19/06; F16C 19/52; F16C 11/0614; F16C 33/08; F16C 35/077; F16C 11/045; F16C 19/26; A63B 22/001; A63B 22/0664; A63B 2022/0682; A63B 22/04; A63B 21/00178; A63B 69/0057; A63B 21/00181; A63B 21/4009; A63B 21/4015; A63B 21/4011; A63B 21/4033; A63B 23/03541; A63B 23/03575; A63B 69/0064; A63B 22/14; A63B 22/203; A63B 22/16; A63B 2208/0233; A63B 2209/10; A63B 2022/067; A63B 2022/0094;
(Continued)

(56) References Cited

U.S. PATENT DOCUMENTS 4,347,549 A * 8/1982 Fechner ............... G11B 23/087
242/906
11,111,962 B1 * 9/2021 Ince ........................ F16C 19/06
(Continued)

FOREIGN PATENT DOCUMENTS

WO WO-2023133746 A1 * 7/2023

*Primary Examiner* — Garrett K Atkinson
(74) *Attorney, Agent, or Firm* — Cooper Legal Group, LLC

(57) ABSTRACT

Disclosed are an anti-static bearing assembly and an elliptical machine. The anti-static bearing assembly includes a bearing seat, a bearing mechanism, and a conductive part, where an accommodating slot hole is provided in one side of the bearing seat, the bearing mechanism includes a bearing inner ring and a bearing outer ring, the bearing outer ring is connected to the bearing seat, a guide hole is provided in the bearing seat, a placement slot is provided in the bearing seat, a first end of the conductive part is inserted into the guide hole and is in conductive contact with the bearing mechanism, and a second end of the conductive part is placed in the placement slot and at least partially protrudes from an outer circumferential side of the bearing seat, such that the second end of the conductive part can be in conductive contact with the armrest swing rod.

10 Claims, 13 Drawing Sheets

(58) Field of Classification Search
CPC ............ A63B 21/225; A63B 2225/093; A63B 2208/0204; A63B 21/0058; A63B 2022/0092; A63B 21/4039; A61G 5/14; A61H 1/0262; A61H 2201/163; A61H 2201/1635; A61H 2201/1269; A61H 2201/1621; A61H 3/008; A61H 2201/1642; A61H 2201/1676

See application file for complete search history.

(56) References Cited

U.S. PATENT DOCUMENTS

| | | | | |
|---|---|---|---|---|
| 2020/0072288 A1* | 3/2020 | Roman | .................. | F16C 19/52 |
| 2021/0291358 A1* | 9/2021 | Phipps | .................. | F16C 11/045 |
| 2021/0308744 A1* | 10/2021 | Maruno | .................. | B21K 1/40 |
| 2022/0018398 A1* | 1/2022 | Sudo | ...................... | F16H 48/22 |
| 2023/0184292 A1* | 6/2023 | Amiriyan | ................ | F16C 19/06 |
| | | | | 384/492 |

\* cited by examiner

ANTI-STATIC BEARING ASSEMBLY AND ELLIPTICAL MACHINE

CROSS-REFERENCE TO RELATED APPLICATIONS

This application claims priority to Chinese Patent Application 202311380924.4, filed on Oct. 24, 2023, which is incorporated herein by reference.

TECHNICAL FIELD

The present disclosure relates to the technical field of elliptical machines, specifically to an anti-static bearing assembly and an elliptical machine.

BACKGROUND

In an existing elliptical machine, a stationary shaft is arranged on a stand column main frame, two armrest swing rods are rotatably mounted on two sides of the stationary shaft through bearing assemblies each including a bearing seat and a bearing mechanism, the bearing mechanisms are arranged on two sides of the stationary shaft in a penetration manner, the bearing seats are sleeved outside the bearing mechanisms, and the armrest swing rods are fixedly sleeved outside the bearing seats. A plug is connected to the stand column main frame, such that as a main part of a conductive system of the elliptical machine, the stand column main frame can lead out most of static electricity to be grounded. However, there is also part of static electricity on the armrest swing rods. The bearing seats are made of plastics, such that when the elliptical machine is used by a user, the static electricity on the armrest swing rods cannot be transmitted to the bearing mechanisms through the bearing seats, and thus cannot be transmitted to the stationary shaft and the stand column main frame to implement grounding, thereby affecting usage experience of the user. Therefore, the conductive system is still not perfect enough, and there are certain safety risks.

SUMMARY

An objective of the present disclosure is to provide an anti-static bearing assembly, to solve the above technical problems.

To achieve the above objective, the present disclosure adopts the following technical solution: an anti-static bearing assembly includes a bearing seat, a bearing mechanism, and a conductive part, where an accommodating slot hole is provided in one side of the bearing seat, the bearing mechanism is mounted in the accommodating slot hole and includes a bearing inner ring and a bearing outer ring which are coaxially arranged and relatively rotatable, the bearing inner ring is fixedly connected to a conductive stationary shaft, the bearing outer ring is fixedly connected to the bearing seat, an outer circumferential side of the bearing seat is used for an armrest swing rod to be fixedly sleeved on, a guide hole communicating with the accommodating slot hole is provided in the bearing seat, a placement slot is provided in the outer circumferential side of the bearing seat, a first end of the conductive part is inserted into the guide hole and is in conductive contact with the bearing mechanism, and a second end of the conductive part is placed in the placement slot and at least partially protrudes from the outer circumferential side of the bearing seat, such that the second end is capable of being in conductive contact with the armrest swing rod when the bearing seat is fixedly sleeved and matched with the armrest swing rod.

The conductive part includes a vertical part, and a first extension part and a second extension part located at two ends of the vertical part and extending towards a same side, the first extension part and the second extension part form the first end and the second end, the first extension part is inserted into the guide hole, the first end is in conductive contact with the bearing outer ring of the bearing mechanism, and the second extension part is placed on the placement slot, such that the second end is in conductive contact with the armrest swing rod; and the bearing mechanism is integrally conductive, that is, the bearing inner ring is conductively connected to the bearing outer ring.

The first extension part includes a transverse section and an inclined contact section located on one side of the transverse section that is away from the vertical part, the first end is one end of the inclined contact section that is away from the transverse section and is in conductive contact with an outer circumferential side wall of the bearing outer ring of the bearing mechanism, the second extension part includes a placement section and a bending contact section located on one side of the placement section that is away from the vertical part, the second end is one end of the bending contact section that is away from the placement section, the placement section is located in the placement slot, and the bending contact section protrudes from the placement slot, such that the second end is in conductive contact with the armrest swing rod.

The bearing seat is a plastic or rubber bearing seat, one side of the bearing seat that is away from the accommodating slot hole is an inner side of the bearing seat, and the conductive part is U-shaped, is mounted on the inner side of the bearing seat, and is provided with an opening towards an outer side.

The bearing seat includes an annular end cover and an annular convex column connected to the annular end cover, the accommodating slot hole is provided in a middle of the annular convex column, a plurality of bumps arranged in a radial shape are arranged on a periphery of the annular convex column, upper surfaces of the bumps form the outer circumferential side of the bearing seat, and the placement slot is located on the upper surface of one of the bumps.

The present disclosure further provides an elliptical machine, including any one of the above anti-static bearing assemblies, armrest swing rods, and a conductively grounded stationary shaft, where the armrest swing rods are rotatably mounted on the stationary shaft by the bearing assemblies and are conductively connected to the stationary shaft by the anti-static bearing assemblies.

Both the armrest swing rods and the stationary shaft are metal conductors; and there are two armrest swing rods rotatably mounted on two sides of the stationary shaft by the bearing assemblies respectively, each of the armrest swing rods includes an armrest, a sleeve, and a swing rod connected in sequence, two opposite bearing assemblies are mounted on each of two sides of the stationary shaft, and the sleeve is fixedly sleeved outside the two opposite bearing assemblies on a same side of the stationary shaft.

The elliptical machine further includes an elliptical machine body, and foot pedal connecting rods and connecting rods pivotally connected to each other, where a conductively grounded stand column main frame is arranged on the elliptical machine body, the stationary shaft is arranged on and conductively connected to the stand column main frame, a damping rotary table is arranged in the elliptical machine body, a base is mounted at a lower part of the elliptical machine body, guide rails are arranged on a rear side of the base that corresponds to the elliptical machine body, front ends of the connecting rods are rotatably connected to the damping rotary table, rear ends of the connecting rods are provided with pulleys, the pulleys are in sliding fit with the guide rails, a front end of each of the foot pedal connecting rods is pivotally connected to a bottom end of the swing rod, and a rear end of the foot pedal connecting rod is provided with a foot pedal.

The elliptical machine further includes screw lock assemblies, buffer pad seats, and hollow spherical balls, where an annular part is fixedly mounted at the bottom end of the swing rod, the spherical balls are rotatably arranged in the annular parts, fixing brackets are arranged at upper parts of the front ends of the foot pedal connecting rods, each of the fixing brackets includes lugs, through holes for the screw lock assemblies to penetrate through and match with are provided in the lugs, the spherical balls are fixedly locked and mounted on the fixing brackets by the screw lock assemblies, and the buffer pad seats are located between the spherical balls and the lugs.

The annular parts, the fixing brackets, and the spherical balls are metal conductors, the annular parts are in conductive contact with the spherical balls, and the buffer pad seats are plastic insulating parts; and the elliptical machine further includes a conductive seat which is mounted on one side of a corresponding one of the lugs and is in conductive contact with a corresponding one of the spherical balls to implement conductive connection between a corresponding one of the fixing brackets and a corresponding one of the annular parts.

The present disclosure has the following beneficial effects:

(1) According to the present disclosure, the conductive part is additionally arranged on the bearing seat, such that static electricity at the armrest swing rod can be sequentially transmitted to the bearing mechanism and the stationary shaft through the conductive part, and finally static grounding is implemented, thereby preventing the static electricity at the armrest swing rod from being unable to be grounded and led out to affect usage experience of a user, making a conductive system of the elliptical machine more perfect, and improving the safety and reliability.

(2) The bearing seat is the plastic or rubber bearing seat, which has high mounting accuracy, is easy to control, and has low mounting difficulty and processing cost compared with a metal bearing seat. In addition, the design of combining the plastic or rubber bearing seat with the conductive part cleverly solves the mounting and cost problems of the metal bearing seat and implements the function of electricity conduction.

(3) The conductive part includes the vertical part, a first extension part, and a second extension part, the first extension part and the second extension part form the first end and the second end, the first extension part is inserted into the guide hole, the first end is in conductive contact with the bearing outer ring of the bearing mechanism, and the second extension part is placed on the placement slot, such that the second end is in conductive contact with the armrest swing rod. This design is skillfully characterized in that the armrest swing rod, the bearing seat, and the bearing outer ring are in a relatively static assembly relationship and do not rotate relatively, such that the conductive part is assembled more stably, prevented from being worn after being used for a certain period of time, and ensured in conductive reliability and service life; and the conductive part is shorter, such that more materials and costs are saved.

Figure 1:
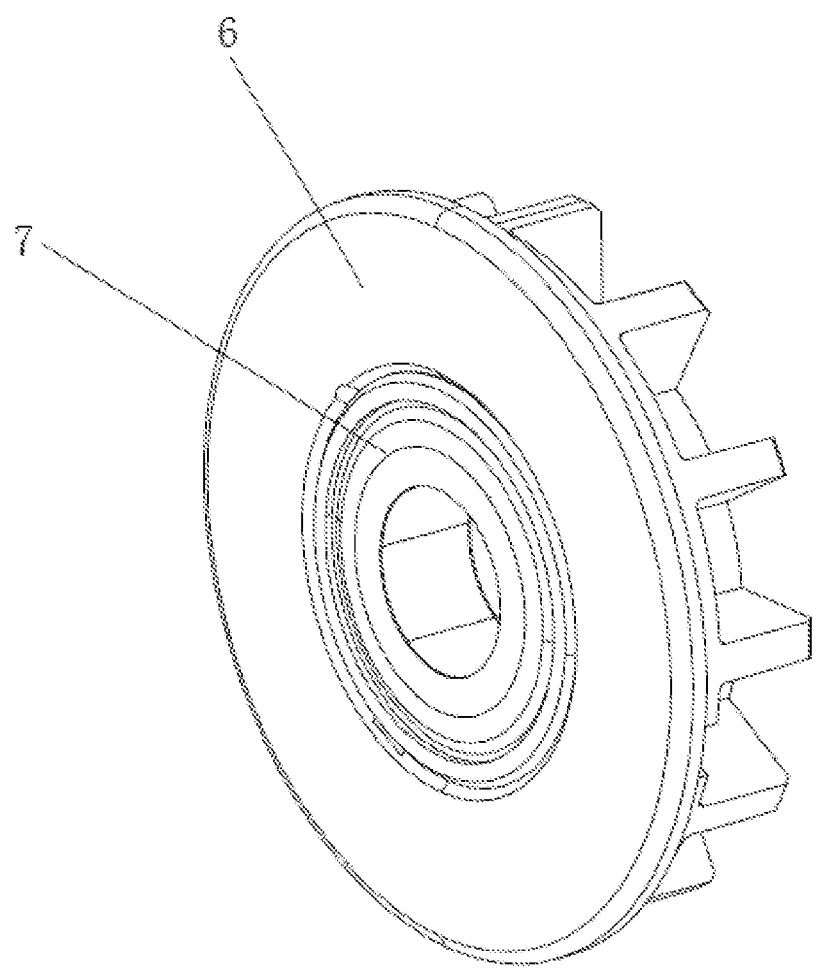
FIG. 1 is an outer side view of a bearing assembly according to an embodiment of the present disclosure.
Figure 2:
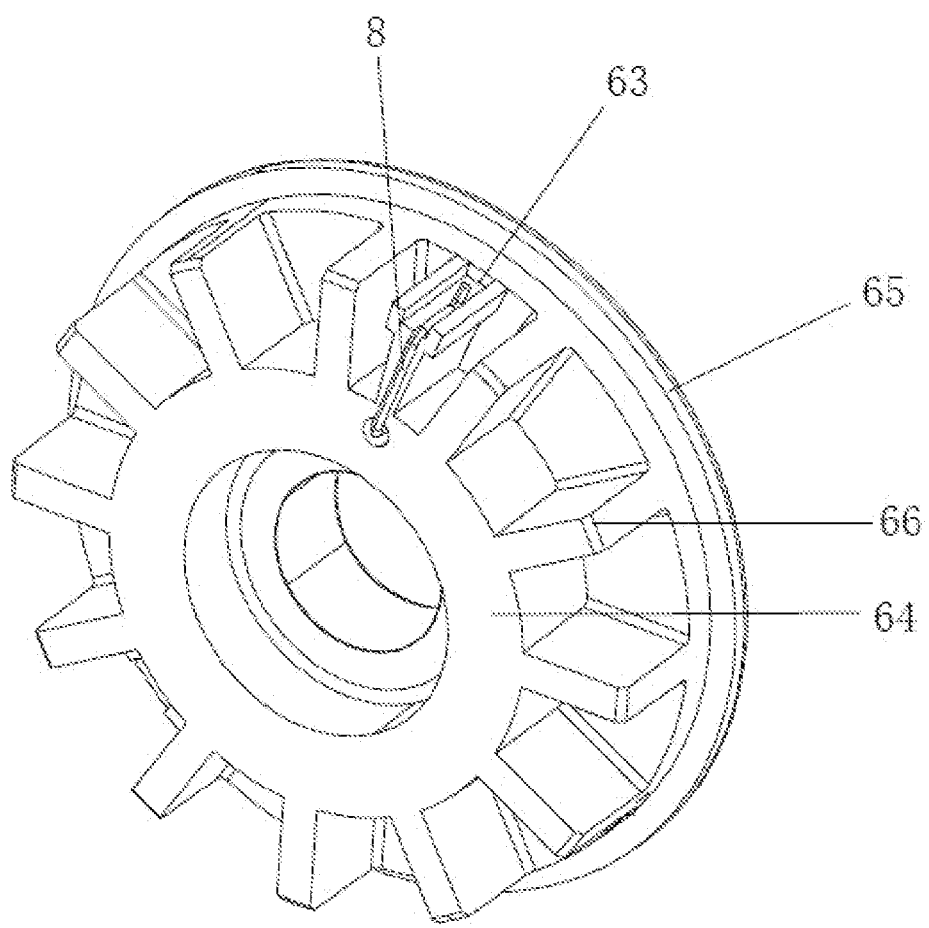
FIG. 2 is an inner side view of a bearing assembly according to an embodiment of the present disclosure.
Figure 3:
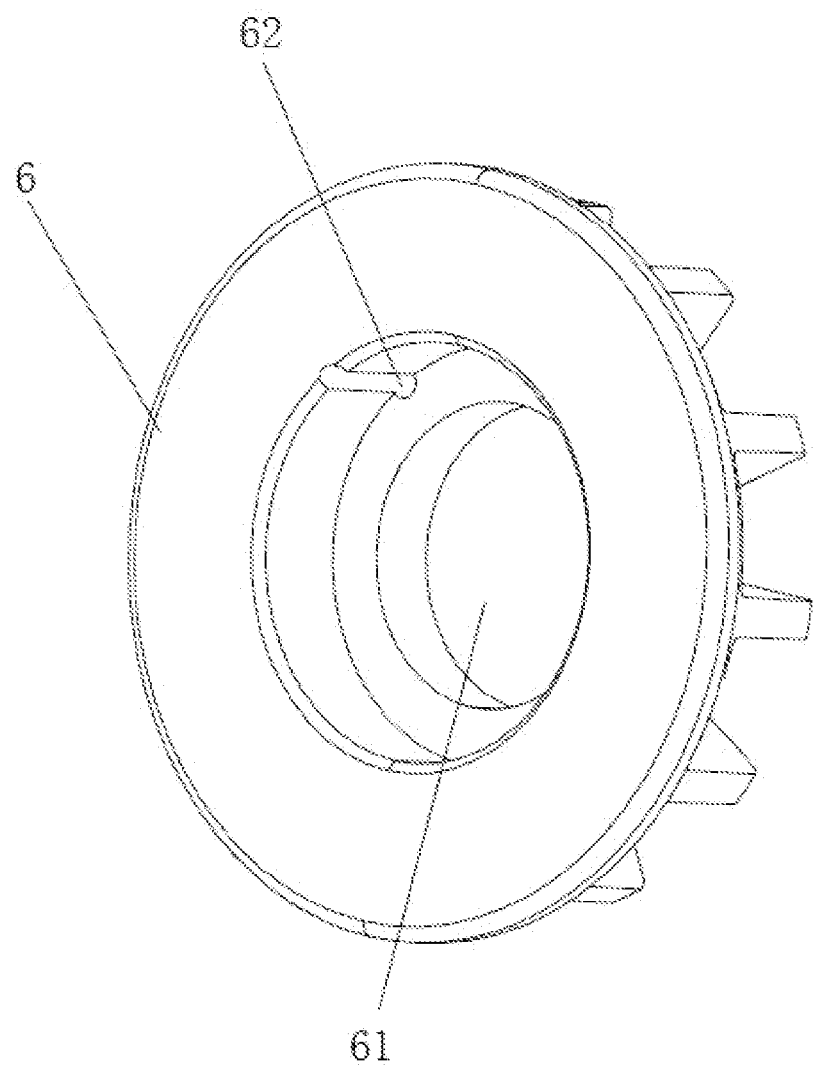
FIG. 3 is a schematic structural diagram of a bearing seat according to an embodiment of the present disclosure.
Figure 4:
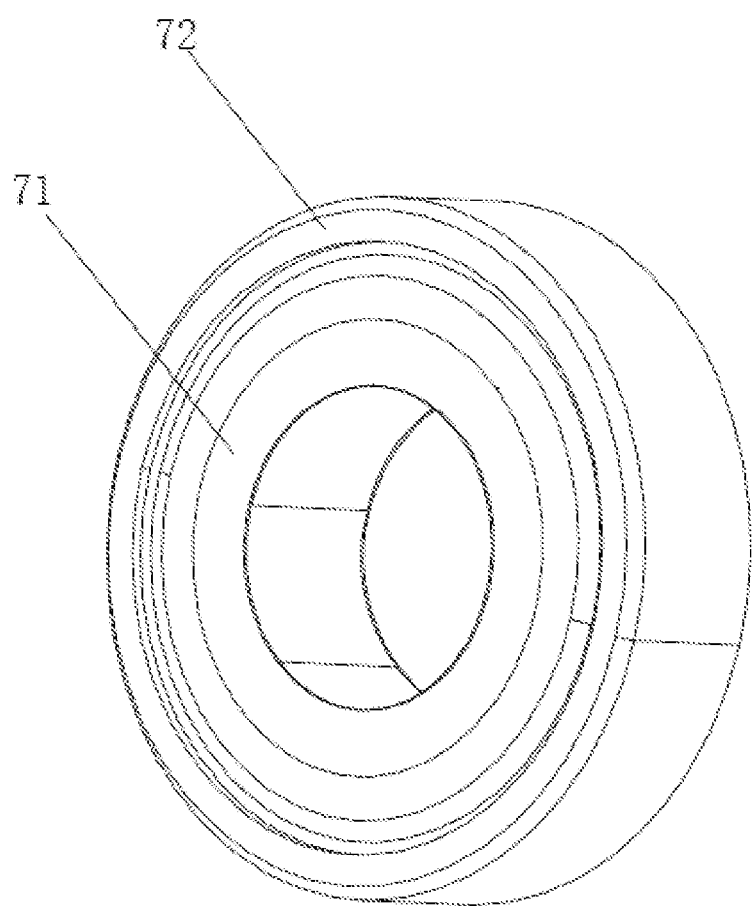
FIG. 4 is a schematic structural diagram of a bearing mechanism according to an embodiment of the present disclosure.
Figure 5:
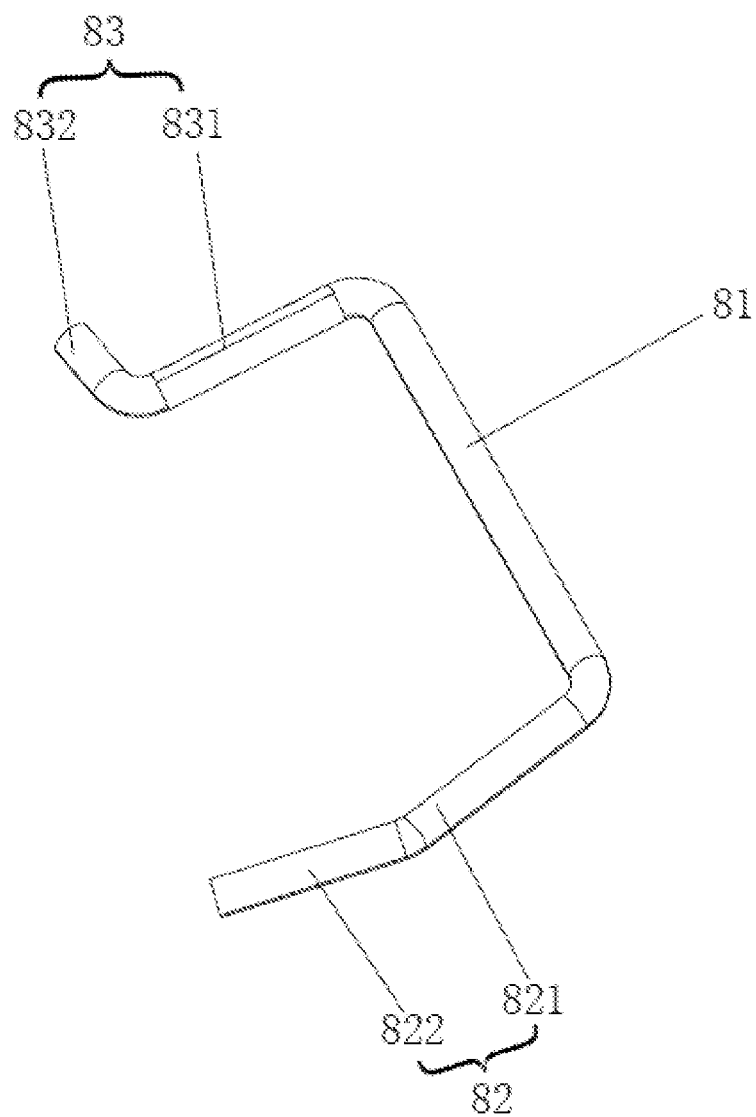
FIG. 5 is a schematic structural diagram of a conductive part according to an embodiment of the present disclosure.
Figure 6:
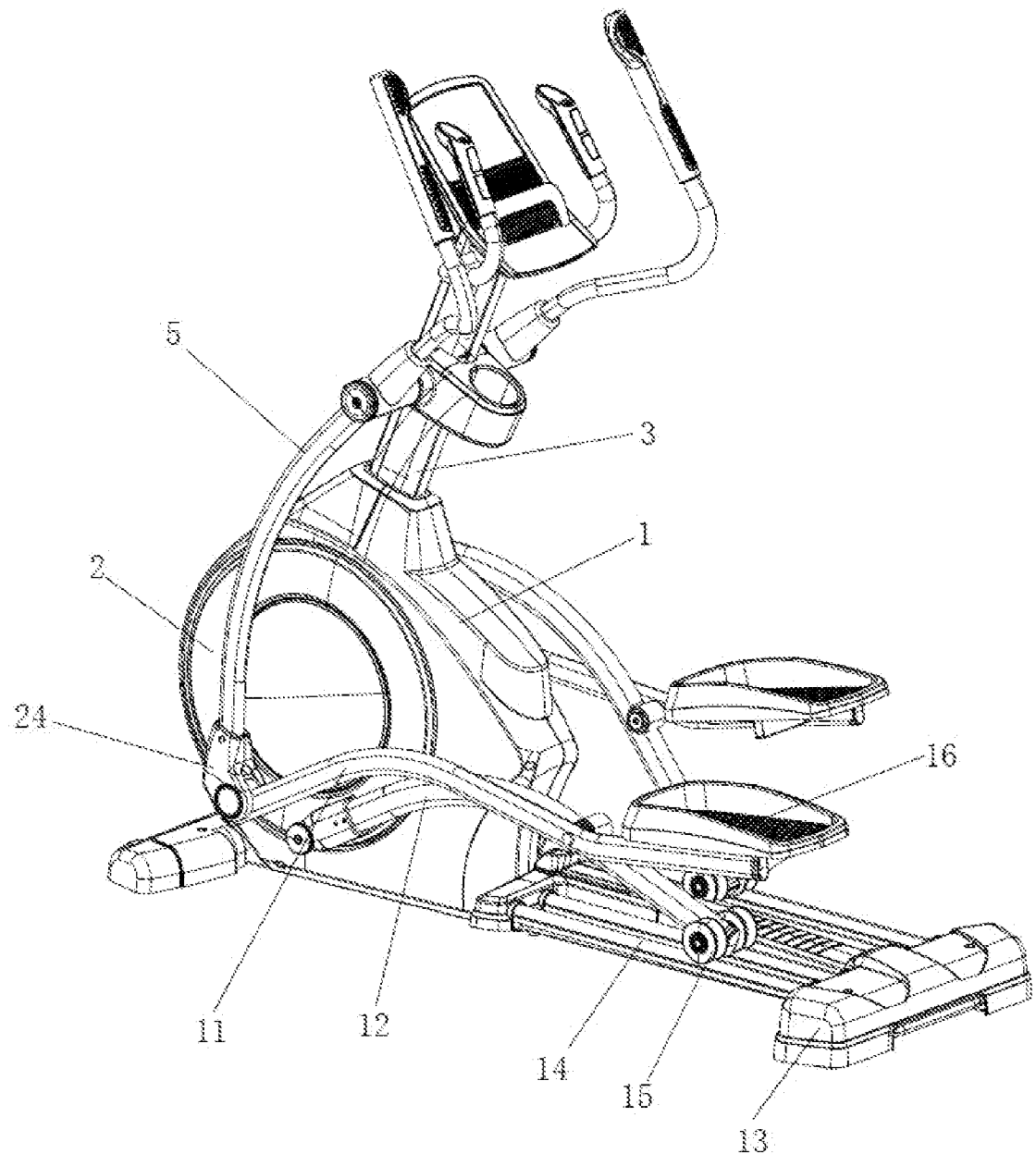
FIG. 6 is a three-dimensional view of an elliptical machine according to an embodiment of the present disclosure.
Figure 7:
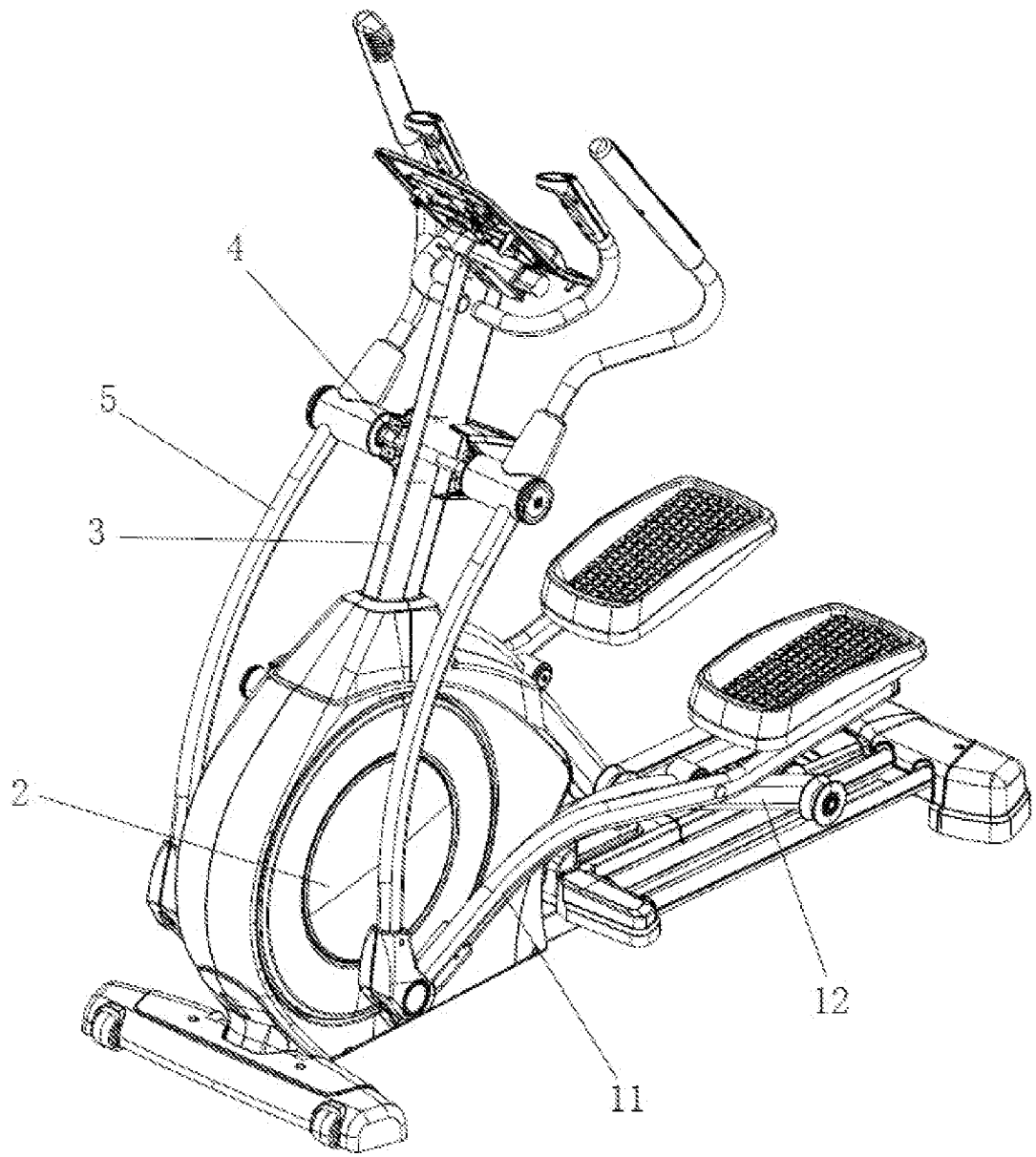
FIG. 7 is a front side view of an elliptical machine according to an embodiment of the present disclosure.
Figure 8:
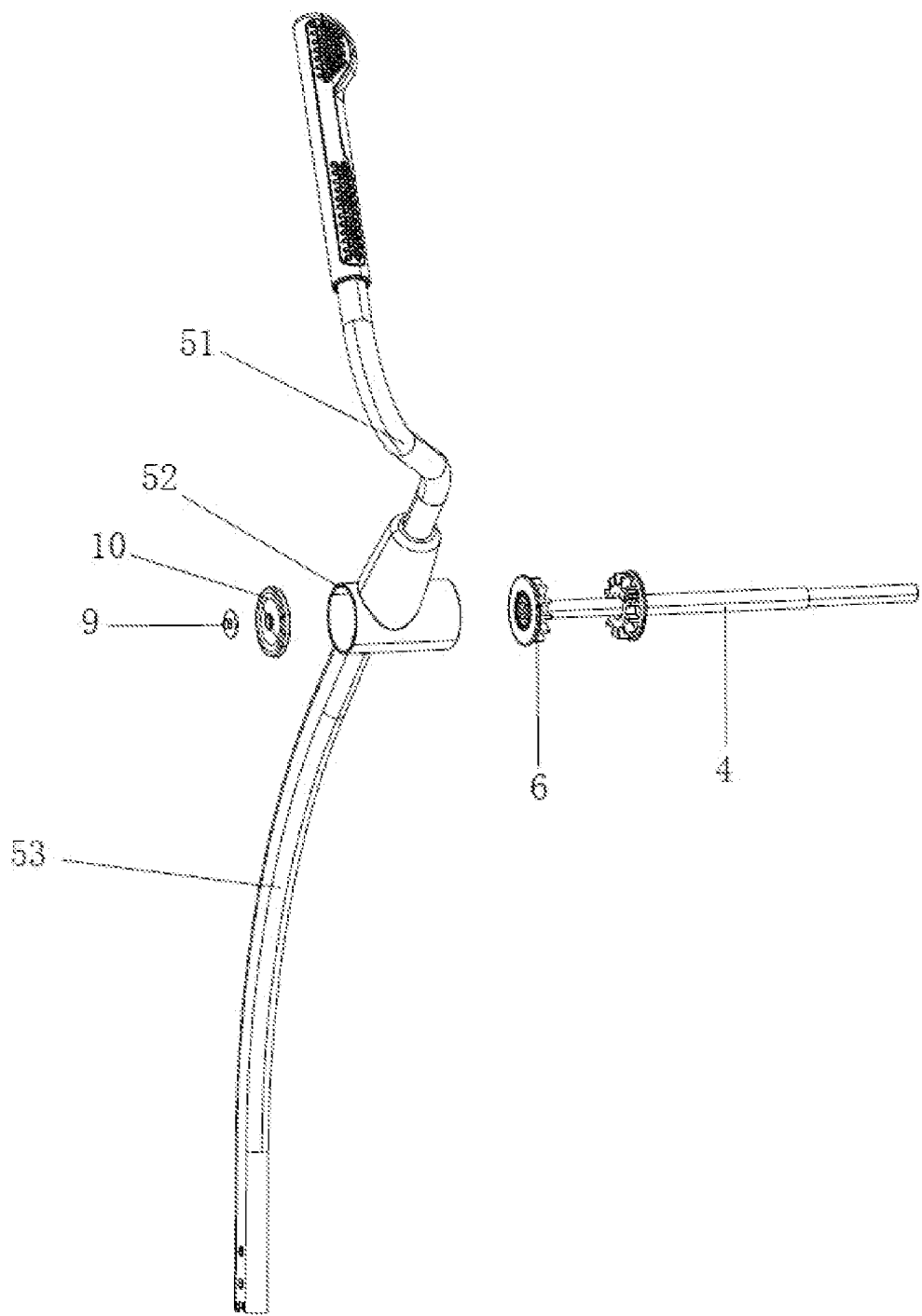
FIG. 8 is a schematic assembly diagram of a stationary shaft, a bearing assembly, and an armrest swing rod according to an embodiment of the present disclosure.

In the drawings: 1—elliptical machine body, 2—damping rotary table, 3—stand column main frame, 4—stationary shaft, 5—armrest swing rod, 51—armrest, 52—sleeve, 53—swing rod, 6—bearing seat, 61—accommodating slot hole, 62—guide hole, 63—placement slot, 64—annular convex column, 65—annular end cover, 66—bump, 7—bearing mechanism, 71—bearing inner ring, 72—bearing outer ring, 8—conductive part, 81—vertical part, 82—first extension part, 821—transverse section, 822—inclined contact section, 83—second extension part, 831—placement section, 832—bending contact section, 9—screw, 10—protective cover, 11—foot pedal connecting rod, 12—connecting rod, 13—base, 14—guide rail, 15—pulley, 16—foot pedal, 17—screw lock assembly, 18—nut, 19—buffer pad seat, 20—spherical ball, 21—annular part, 22—fixing bracket, 221—lug, 222—through hole, 223—insertion hole, 23—conductive seat, 231—conductive insert, and 24—guard.

DESCRIPTION OF EMBODIMENTS

To further describe embodiments, the present disclosure provides accompanying drawings. These drawings constitute a part of content of the present disclosure and are mainly used to illustrate the embodiments and to explain the operating principles of the embodiments in conjunction with the related description of the specification. With reference to the content, those of ordinary skill in the art can understand other possible embodiments and advantages of the present disclosure. Components in figures are not drawn to scale, and similar component signs are often used to refer to similar components.

Referring to FIGS. 1 to 5, as an embodiment of the present disclosure, an anti-static bearing assembly is provided, including a bearing seat 6, a bearing mechanism 7, and a conductive part 8, where an accommodating slot hole 61 is provided in one side of the bearing seat 6; the bearing mechanism 7 is mounted in the accommodating slot hole 61 and includes a bearing inner ring 71 and a bearing outer ring 72 which are coaxially arranged and relatively rotatable, and the bearing mechanism 7 in the prior art is generally a metal bearing; the bearing inner ring 71 is conductively connected to the bearing outer ring 72 by a roller or a ball, that is, the bearing mechanism 7 is integrally conductive, the bearing inner ring 71 is fixedly connected to a conductive stationary shaft 4, and the bearing outer ring 72 is fixedly connected to the bearing seat 6; an outer circumferential side of the bearing seat 6 is used for an armrest swing rod 5 to be fixedly sleeved on; in order to ensure the assembly precision and the processing cost, the bearing seat 6 is a plastic or rubber bearing seat 6; a guide hole 62 communicating with the accommodating slot hole 61 is provided in the bearing seat 6; a placement slot 63 is provided in the outer circumferential side of the bearing seat 6; and a first end of the conductive part 8 is inserted into the guide hole 62 and is in conductive contact with the bearing mechanism 7, and a second end of the conductive part 8 is placed in the placement slot 63 and at least partially protrudes from the outer circumferential side of the bearing seat 6, such that the second end is capable of being in conductive contact with the armrest swing rod 5 when the bearing seat 6 is fixedly sleeved and matched with the armrest swing rod 5. According to the present disclosure, the bearing assembly may be specifically applied to the elliptical machine, such that static electricity at the armrest swing rod 5 can be sequentially transmitted to the bearing mechanism 7 and the stationary shaft 4 through the conductive part 8, and finally static grounding is implemented, thereby preventing the static electricity at the armrest swing rod 5 from being unable to be grounded and led out to affect usage experience of a user, making a conductive system of the elliptical machine more perfect, and improving the safety and reliability.

Certainly, in other cases, the bearing seat 6 may be made of a metal, but has high requirements for mounting accuracy, is difficult to control, and has high mounting difficulty and processing cost. Therefore, the design of combining the plastic bearing seat 6 with the conductive part 8 cleverly solves the defect problems of the metal bearing seat 6 and implements the function of electricity conduction. In addition, even if the bearing seat 6 is made of an expensive and conductive material, the conductive reliability will be reduced due to wear during use, so it is necessary to add the design of the conductive part 8 to further improve the conductive reliability.

In this embodiment, the conductive part 8 includes a vertical part 81, and a first extension part 82 and a second extension part 83 located at two ends of the vertical part 81 and extending towards a same side, the first extension part 82 and the second extension part 83 form the first end and the second end, the first extension part 82 is inserted into the guide hole 62, the first end is in conductive contact with the bearing outer ring 72 of the bearing mechanism 7, and the second extension part 83 is placed on the placement slot 63, such that the second end is in conductive contact with the armrest swing rod 5. Specifically, the first extension part 82 includes a transverse section 821 and an inclined contact section 822 located on one side of the transverse section 821 that is away from the vertical part 81, the first end is one end of the inclined contact section 822 that is away from the transverse section and is in conductive contact with an outer circumferential side wall of the bearing outer ring 72 of the bearing mechanism 7. This design is skillfully characterized in that the armrest swing rod 5, the bearing seat 6, and the bearing outer ring 72 are in a relatively static assembly relationship and do not rotate relatively, such that the conductive part 8 is assembled more stably, prevented from being worn after being used for a certain period of time, and ensured in conductive reliability and service life; and the conductive part is shorter, such that more materials and costs are saved. In addition, the inclined contact section 822 is clamped between the outer circumferential side wall of the bearing outer ring 72 and an annular side wall of the accommodating slot hole 61, which further improves the assembly stability at the first extension part 82.

The second extension part 83 includes a placement section 831 and a bending contact section 832 located on one side of the placement section 831 that is away from the vertical part 81, the second end is one end of the bending contact section 832 that is away from the placement section 831, the placement section 831 is located in the placement slot 63, and the bending contact section 832 protrudes from the placement slot 63, such that the second end is in conductive contact with the armrest swing rod 5. This design ensures the stability of the second extension part 83 mounted in the placement slot 63, thereby ensuring the conductive stability. Certainly, the second extension part 83 is a separate placement section 831, and the placement section 831 is mounted in the placement slot 63 and protrudes from the placement slot 63 to be in conductive contact with the armrest swing rod 5. That is to say, the first extension part 82 and the second extension part 83 may be specifically bent or inclined according to an actual assembly condition, so as to ensure the best conductive effect.

In other embodiments, the bearing mechanism may not be integrally conductive, for example, the bearing outer ring is a ceramic outer ring. When the bearing outer ring is a metal inner ring, the first end of the conductive part may be directly in conductive contact with the metal inner ring to transmit static electricity to the stationary shaft, and finally static grounding is implemented. However, because the armrest swing rod, the bearing seat, and the bearing outer ring are in a relatively rotating assembly relationship with the bearing inner ring, if the first end is in conductive contact with the bearing inner ring, the assembly stability of the conductive part is poor, the wear easily occurs after long-term use, the conductive reliability and the service life are reduced and shortened, the length is longer, and the cost is higher.

In this embodiment, one side of the bearing seat 6 that is away from the accommodating slot hole 61 is an inner side of the bearing seat 6; the conductive part 8 is a metal conductive part, which is more common and economical; and the conductive part 8 is U-shaped, is mounted on the inner side of the bearing seat 6, and is provided with an opening towards an outer side. This ensures the airtightness, reliability, stability, and attractiveness of assembly between an outer side surface of the bearing seat 6 and the armrest swing rod 5.

In this embodiment, the bearing seat 6 includes an annular end cover 65 and an annular convex column 64 connected to the annular end cover, the accommodating slot hole 61 is provided in a middle of an outer side of the annular convex column 64, a plurality of bumps 66 arranged in a radial shape are arranged on a periphery of the annular convex column 64, upper surfaces of the bumps 66 form the outer circumferential side of the bearing seat 6, and the placement slot is located on the upper surface of one of the bumps 66. This design reduces the weight of the bearing seat 6 as a whole and facilitates holding and direction identification for assembly. The annular end cover 65 and the annular convex column 64 are distributed on an outer side and an inner side of the bearing seat 6 respectively, making the assembly more reasonable and attractive.

Figure 9:
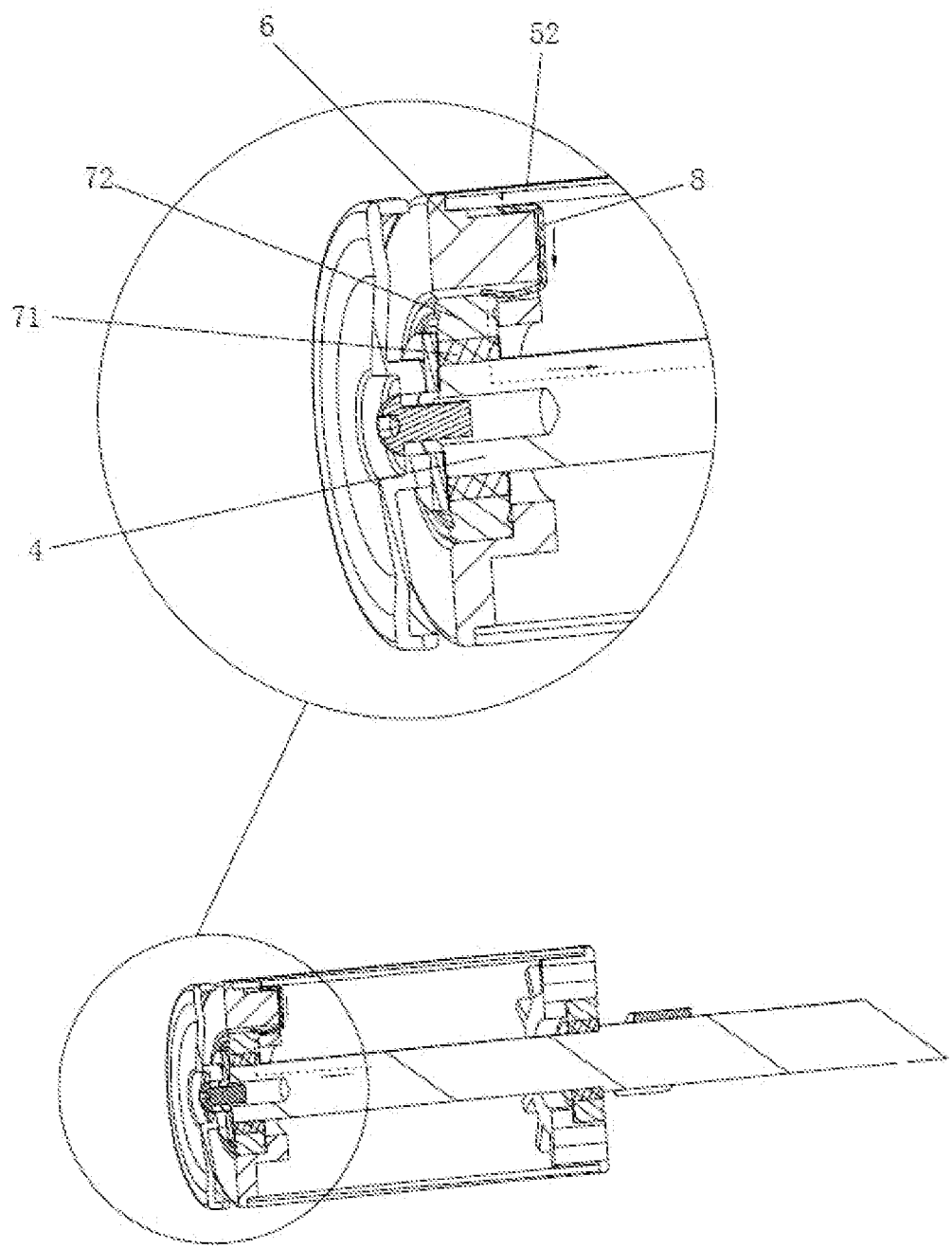
FIG. 9 is a diagram of a transmission path of static electricity among a sleeve of an armrest swing rod, a bearing assembly, and a stationary shaft.
Figure 10:
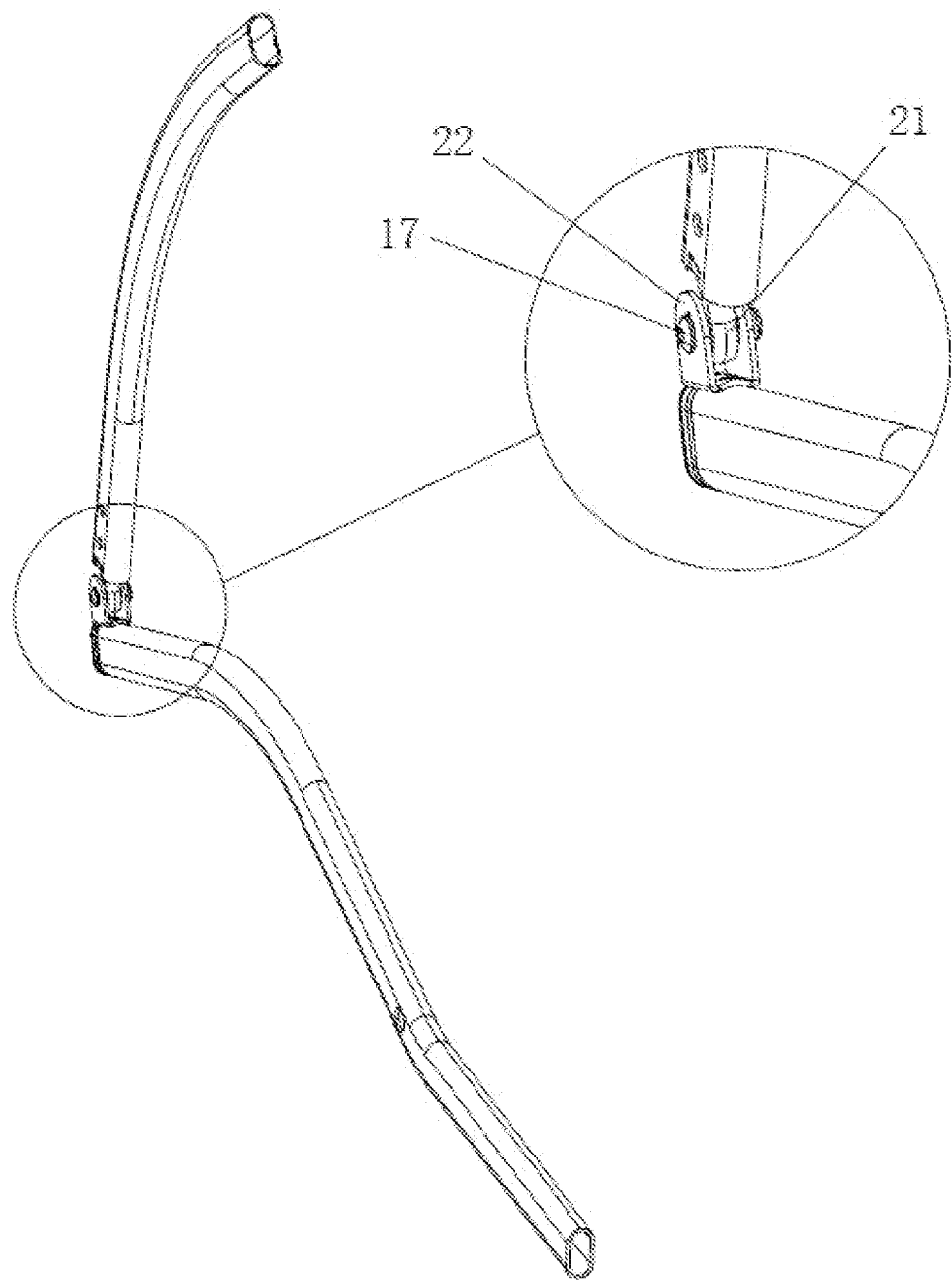
FIG. 10 is a schematic assembly diagram of an armrest swing rod and a foot pedal connecting rod according to an embodiment of the present disclosure.
Figure 11:
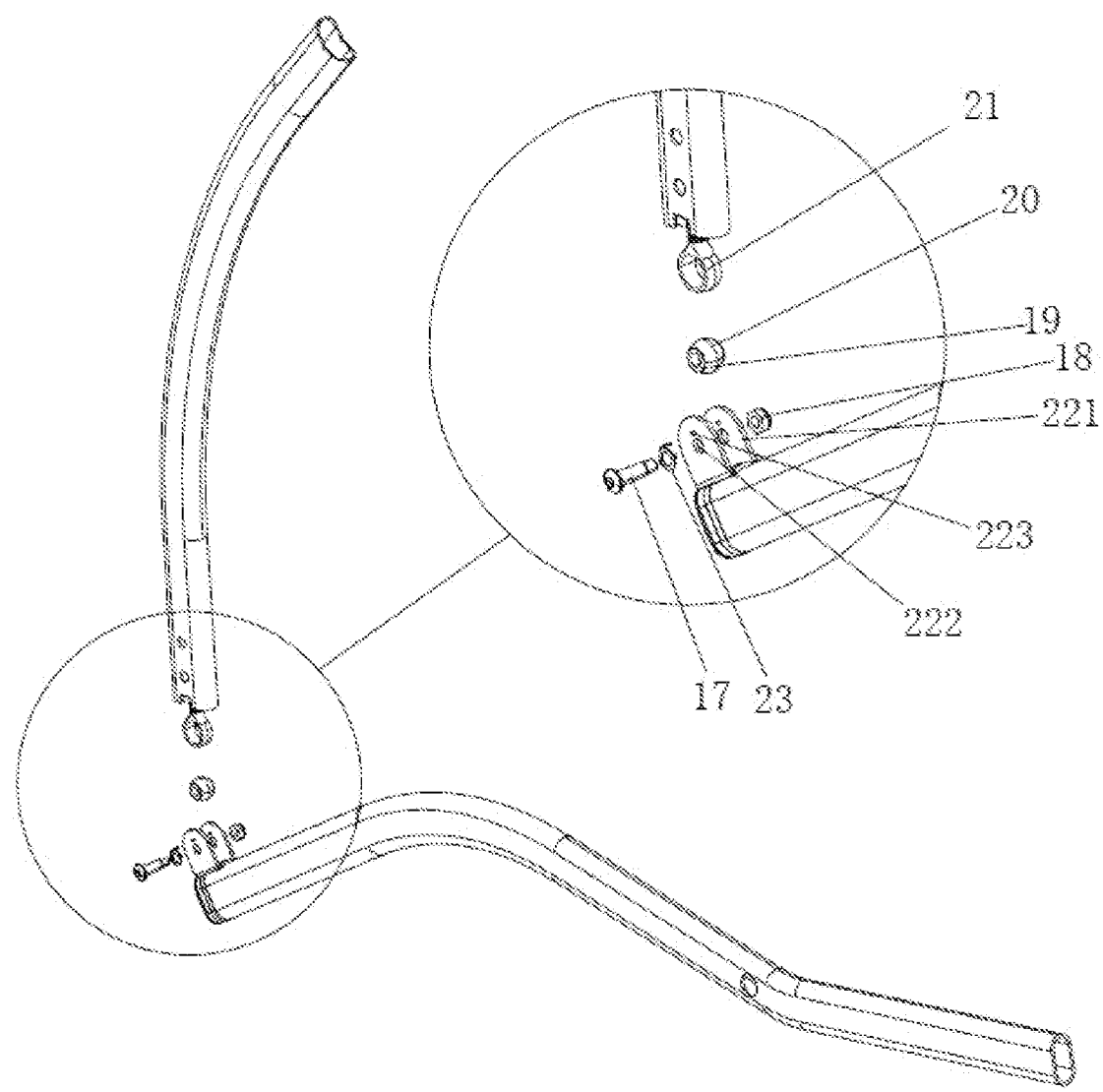
FIG. 11 is a schematic disassembly diagram of an armrest swing rod and a foot pedal connecting rod according to an embodiment of the present disclosure.
Figure 12:
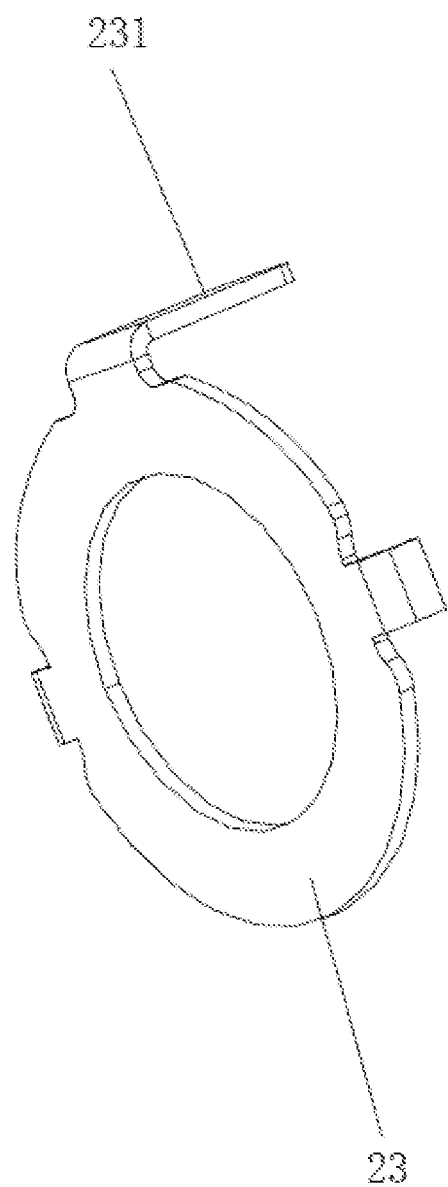
FIG. 12 is a schematic structural diagram of a conductive seat according to an embodiment of the present disclosure.
Figure 13:
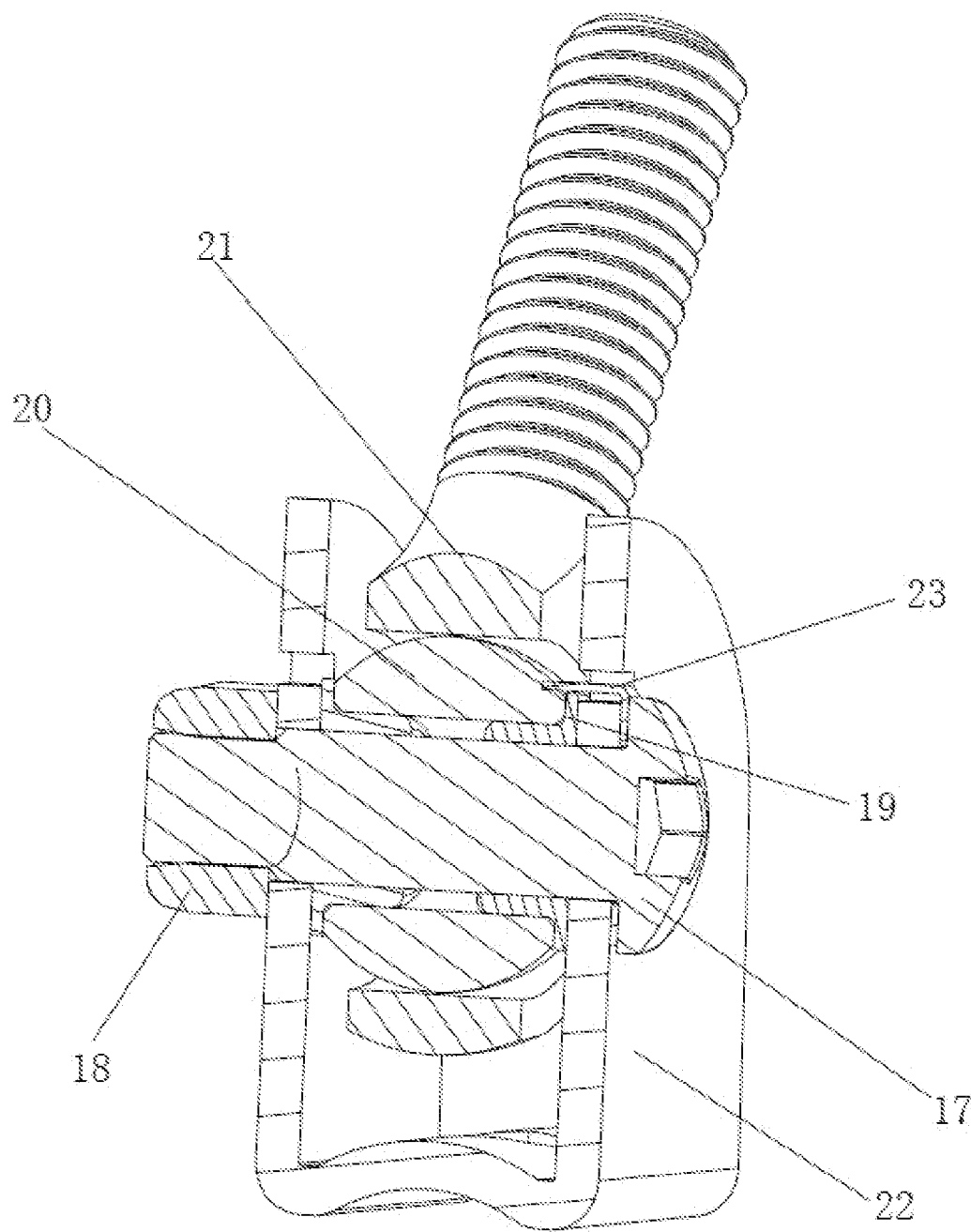
FIG. 13 is a sectional view of a pivot assembly between an armrest swing rod and a foot pedal connecting rod according to an embodiment of the present disclosure.

Referring to FIGS. 6 to 13, the present disclosure further provides an elliptical machine, including the anti-static bearing assemblies described in the above embodiment, armrest swing rods 5, and a conductively grounded stationary shaft 4, where both the armrest swing rods 5 and the stationary shaft 4 are metal conductors, the armrest swing rods 5 are rotatably mounted on the stationary shaft 4 by the bearing assemblies and are conductively connected to the stationary shaft 4 by the bearing assemblies. Specifically, there are two armrest swing rods 5 rotatably mounted on two sides of the stationary shaft 4 by the bearing assemblies respectively, each of the armrest swing rods 5 includes an armrest 51, a sleeve 52, and a swing rod 53 connected in sequence, two opposite bearing assemblies are mounted on each of two sides of the stationary shaft 4, the sleeve 52 is fixedly sleeved outside the two opposite bearing assemblies on a same side of the stationary shaft 4, that is, annular end covers 65 of two bearing seats 6 are mounted at two ends of the sleeve 52 in a blocking manner respectively, and finally a protective cover 10 is mounted on an outer side of the sleeve 52 through locking fit between a screw 9 and the stationary shaft 4, thereby achieving the effect of protective shielding, and improving the attractiveness. As shown in FIG. 9, a dashed line is a transmission path of static electricity, and an arrow direction is a transmission direction. The static electricity at the armrest swing rod 5 can be transmitted to the stationary shaft 4 sequentially through the sleeve 52, the conductive part 8, the bearing outer ring 72, and the bearing inner ring 71, and finally static grounding is implemented, thereby ensuring usage experience of a user, making a conductive system of the elliptical machine more perfect, and improving the safety and reliability.

In this embodiment, the elliptical machine further includes an elliptical machine body 1, and foot pedal connecting rods 11 and connecting rods 12 pivotally connected to each other, where a conductively grounded stand column main frame 3 is arranged on the elliptical machine body 1, the stationary shaft 4 is arranged on and conductively connected to the stand column main frame 3, a damping rotary table 2 is arranged in the elliptical machine body 1, a base 13 is mounted at a lower part of the elliptical machine body 1, guide rails 14 are arranged on a rear side of the base 13 that corresponds to the elliptical machine body 1, front ends of the connecting rods 12 are rotatably connected to the damping rotary table 2, rear ends of the connecting rods 12 are provided with pulleys 15, the pulleys 15 are in sliding fit with the guide rails 14, a front end of each of the foot pedal connecting rods 11 is pivotally connected to a bottom end of the swing rod 53, a rear end of the foot pedal connecting rod 11 is provided with a foot pedal 16, and a data display screen and fixed handles are arranged at a top of the stand column main frame 3.

In this embodiment, the elliptical machine further includes screw lock assemblies, buffer pad seats 19, and hollow spherical balls 20, where an annular part 21 is fixedly mounted at the bottom end of the swing rod 53, the spherical balls 20 are rotatably arranged in the annular parts 21, fixing brackets 22 are arranged at upper parts of the front ends of the foot pedal connecting rods 11, each of the fixing brackets 22 includes lugs 221, through holes 222 for the screw lock assemblies to penetrate through and match with are provided in the lugs 221, the spherical balls 20 are fixedly locked and mounted on the fixing brackets 22 by the screw lock assemblies, and the buffer pad seats 19 are located between the spherical balls 20 and the lugs 221. The annular parts 21, the fixing brackets 22, and the spherical balls 20 are metal conductors, the annular parts 21 are in conductive contact with the spherical balls 20, and the buffer pad seats 19 are plastic insulating parts, thereby achieving the buffering effect.

In this embodiment, in order to further improve the conductive system of the elliptical machine to transmit static electricity at the foot pedal connecting rods 11 to the armrest swing rods 5 and finally implement grounding, the elliptical machine further includes a conductive seat 23 which is mounted on one side of a corresponding one of the lugs 221 and is in conductive contact with a corresponding one of the spherical balls 20 to implement conductive connection between a corresponding one of the fixing brackets 22 and a corresponding one of the annular parts 21. Specifically, each of the screw lock assemblies includes a bolt 17 and a nut 18 matched with each other, the conductive seat 23 is mounted between the bolt 17 and the outer side wall of the lug 221, the conductive seat 23 extends inwards to form a conductive insert 231, the lug 221 is provided with an insertion hole 223, and the conductive insert 231 penetrates into the insertion hole 223 to be in conductive contact with the spherical ball 20. This design ensures that the static electricity at the foot pedal connecting rods 11 can be transmitted to the spherical balls 20 through the conductive seats 23 and then transmitted to the stationary shaft 4 and the stand column main frame 3 sequentially through the armrest swing rods 5 and the bearing assemblies, and finally static grounding is implemented, thereby further improving the usage experience of the user, and improving the safety and reliability.

In this embodiment, the bearing mechanism 7 further includes a plurality of rolling elements mounted between the bearing inner ring 71 and the bearing outer ring 72. Specifically, the rolling elements are balls or rollers, so as to implement relative rotation and conductive connection between the bearing inner ring 71 and the bearing outer ring 72.

In this embodiment, the annular part 21, the bolt 17, the nut 18, the conductive seat 23, the buffer pad seat 19, the spherical ball 20, and the fixing bracket 22 constitute a pivot assembly, and a guard 24 is mounted at a periphery of the bottom end of the swing rod 53 that corresponds to the pivot assembly, is configured to shield and protect the pivot assembly, and improves the attractiveness.

A usage process for the present disclosure is as follows:
The user holds the armrests 51 with both hands and steps on the two pedals 16 with both feet alternately to drive the foot pedal connecting rods 11, the connecting rods 12, and the armrest swing rods 5 to act in cooperation, and then the damping rotary table 2 is driven to rotate, thereby achieving the purpose of body building. The operation is convenient and simple. Static electricity generated by the hands of the user can be transmitted to the stand column main frame 3 sequentially through the armrest swing rods 5, the conductive parts 8, the bearing mechanisms 7, and the stationary shaft 4, and finally the grounding is implemented. Static electricity generated by the feet of the user can be transmitted to the armrest swing rods 5 sequentially through the foot pedal connecting rods 11, the conductive seats 23, the spherical balls 20, and the annular parts 21, and finally transmitted to the stand column main frame 3 through the bearing assemblies to implement the grounding, thereby ensuring the usage experience of the user, and improving the safety and reliability.

While the present disclosure has been specifically shown and described with reference to preferred embodiments, it is to be understood by those skilled in the art that various changes in form and details may be made to the present disclosure without departing from the spirit and scope of the present disclosure defined by the appended claims, and all fall within the scope of protection of the present disclosure.

The invention claimed is:

1. An anti-static bearing assembly, comprising a bearing seat, a bearing mechanism, and a conductive part, wherein an accommodating slot hole is provided in one side of the bearing seat, the bearing mechanism is mounted in the accommodating slot hole and comprises a bearing inner ring and a bearing outer ring which are coaxially arranged and relatively rotatable, the bearing inner ring is fixedly connected to a conductive stationary shaft, the bearing outer ring is fixedly connected to the bearing seat, an outer circumferential side of the bearing seat is configured for an armrest swing rod to be fixedly sleeved thereon, a guide hole communicating with the accommodating slot hole is provided in the bearing seat, a placement slot is provided in the outer circumferential side of the bearing seat, a first end of the conductive part is inserted into the guide hole and is in conductive contact with the bearing mechanism, and a second end of the conductive part is placed in the placement slot and at least partially protrudes from the outer circumferential side of the bearing seat, such that the second end is configured to be in conductive contact with the armrest swing rod when the bearing seat is fixedly sleeved and matched with the armrest swing rod.

2. The anti-static bearing assembly according to claim 1, wherein the conductive part comprises a vertical part, and a first extension part and a second extension part located at two ends of the vertical part and extending towards a same side, the first extension part and the second extension part form the first end and the second end, the first extension part is inserted into the guide hole, the first end is in conductive contact with the bearing outer ring of the bearing mechanism, and the second extension part is placed on the placement slot, such that the second end is configured to be in conductive contact with the armrest swing rod; and the bearing inner ring is conductively connected to the bearing outer ring such that the bearing mechanism is integrally conductive.

3. The anti-static bearing assembly according to claim 2, wherein the first extension part comprises a transverse section and an inclined contact section located on one side of the transverse section that is away from the vertical part, the first end is one end of the inclined contact section that is away from the transverse section and is in conductive contact with an outer circumferential side wall of the bearing outer ring of the bearing mechanism, the second extension part comprises a placement section and a bending contact section located on one side of the placement section that is away from the vertical part, the second end is one end of the bending contact section that is away from the placement section, the placement section is located in the placement slot, and the bending contact section protrudes from the placement slot, such that the second end is configured to be in conductive contact with the armrest swing rod.

4. The anti-static bearing assembly according to claim 2, wherein the bearing seat is a plastic or rubber bearing seat, one side of the bearing seat that is away from the accommodating slot hole is an inner side of the bearing seat, and the conductive part is U-shaped, is mounted on the inner side of the bearing seat, and is provided with an opening towards an outer side.

5. The anti-static bearing assembly according to claim 1, wherein the bearing seat comprises an annular end cover and an annular convex column connected to the annular end cover, the accommodating slot hole is provided in a middle of the annular convex column, a plurality of bumps arranged in a radial shape are arranged on a periphery of the annular convex column, upper surfaces of the plurality of bumps form the outer circumferential side of the bearing seat, and the placement slot is located on the upper surface of one of the plurality of bumps.

6. An elliptical machine, comprising a plurality of anti-static bearing assemblies according to claim 1, armrest swing rods, and a conductively grounded stationary shaft, wherein the armrest swing rods are rotatably mounted on the conductively grounded stationary shaft by the anti-static bearing assemblies and are conductively connected to the conductively grounded stationary shaft by the anti-static bearing assemblies.

7. The elliptical machine according to claim 6, wherein both the armrest swing rods and the conductively grounded stationary shaft are metal conductors; and there are two of the armrest swing rods rotatably mounted on two sides of the conductively grounded stationary shaft by the anti-static bearing assemblies respectively, each of the armrest swing rods comprises an armrest, a sleeve, and a swing rod connected in sequence, two opposite anti-static bearing assemblies of the anti-static bearing assemblies are mounted on each of two sides of the conductively grounded stationary shaft, and the sleeve is fixedly sleeved outside the two opposite anti-static bearing assemblies on a same side of the conductively grounded stationary shaft.

8. The elliptical machine according to claim 7, further comprising an elliptical machine body, and foot pedal connecting rods and connecting rods pivotally connected to each other, wherein a conductively grounded stand column main frame is arranged on the elliptical machine body, the conductively grounded stationary shaft is arranged on and conductively connected to the conductively grounded stand column main frame, a damping rotary table is arranged in the elliptical machine body, a base is mounted at a lower part of the elliptical machine body, guide rails are arranged on a rear side of the base that corresponds to the elliptical machine body, front ends of the connecting rods are rotatably connected to the damping rotary table, rear ends of the connecting rods are provided with pulleys, the pulleys are in sliding fit with the guide rails, a front end of each of the foot pedal connecting rods is pivotally connected to a bottom end of the swing rod, and a rear end of each of the foot pedal connecting rods is provided with a foot pedal.

9. The elliptical machine according to claim 8, further comprising screw lock assemblies, buffer pad seats, and hollow spherical balls, wherein an annular part is fixedly mounted at the bottom end of the swing rod, the hollow spherical balls are rotatably arranged in the annular part, fixing brackets are arranged at upper parts of the front ends of the foot pedal connecting rods, each of the fixing brackets comprises lugs, through holes for the screw lock assemblies to penetrate through and match with are provided in the lugs, the hollow spherical balls are fixedly locked and mounted on the fixing brackets by the screw lock assemblies, and the buffer pad seats are located between the hollow spherical balls and the lugs.

10. The elliptical machine according to claim 9, wherein the annular part, the fixing brackets, and the hollow spherical balls are metal conductors, the annular part is in conductive contact with the hollow spherical balls, and the buffer pad seats are plastic insulating parts; and the elliptical machine further comprises a conductive seat which is mounted on one side of a corresponding one of the lugs and is in conductive contact with a corresponding one of the hollow spherical balls to implement conductive connection between a corresponding one of the fixing brackets and the annular part.

* * * * *